United States Patent [19]
Wittstock

[11] Patent Number: 5,205,077
[45] Date of Patent: Apr. 27, 1993

[54] APPARATUS FOR CONTROLLING OPERATION OF A LAPPING, HONING OR POLISHING MACHINE

[75] Inventor: Gerhard Wittstock, Uetersen, Fed. Rep. of Germany

[73] Assignee: Peter Wolters AG, Rendsburg, Fed. Rep. of Germany

[21] Appl. No.: 751,266

[22] Filed: Aug. 28, 1991

[30] Foreign Application Priority Data

Aug. 31, 1990 [DE] Fed. Rep. of Germany ....... 4027628

[51] Int. Cl.$^5$ .............................................. B24B 49/00
[52] U.S. Cl. .............................. 51/165 R; 51/165.71; 51/165.74; 51/165.76; 51/118
[58] Field of Search ........... 51/165 R, 165.71, 165.74, 51/165.76, 111 R, 117, 118, 127, 131.1, 131.3, 133

[56] References Cited

U.S. PATENT DOCUMENTS

| | | | |
|---|---|---|---|
| 3,892,092 | 7/1975 | Keith, Jr. ................. | 51/133 |
| 4,916,868 | 4/1990 | Wittstock .............. | 51/165.74 |
| 4,962,616 | 10/1990 | Wittstock ............... | 51/131.1 |

FOREIGN PATENT DOCUMENTS 295760 11/1989 Japan ..................... 51/133

*Primary Examiner*—M. Rachuba
*Attorney, Agent, or Firm*—Dykema Gossett

[57] ABSTRACT

An apparatus for controlling operation of a lapping, honing or polishing machine comprising at least one working disk having an abrasive means for honing, lapping, or polishing the surface of a work-piece and adapted to be driven by a variable working disk drive, at least one planetary gear member for carrying said work-piece and having teeth at its outer periphery, and inner and outer gear members in driving engagement with said planetary gear member, at least said inner gear member being driven by a variable inner gear member drive, said apparatus including a control stage for providing a control signal to said working disk drive and said inner gear member drive for controlling desired drive speeds, the improvement of which includes a computer 44 connected to said control stage for generating input signals for said control stage, which computer is arranged to calculate the speed of said inner gear member drive and the speed of said working disk drive by the following formulas:

$$n_L = K_L \cdot n_M$$

$$n_A = n \pm K_{UL} \cdot n_M$$

wherein $K_L$ and $K_{UL}$ are constants of the rolling geometry of said gear members and $n_L$ representing the rotational speed of the planetary gear member and n representing the difference between the working disk speed n and the orbital speed of the planetary gear member are preselected desired values.

12 Claims, 2 Drawing Sheets

APPARATUS FOR CONTROLLING OPERATION OF A LAPPING, HONING OR POLISHING MACHINE

The present invention relates to an apparatus for controlling operation of a lapping, honing or polishing machine.

In prior art machines of this type the work-pieces are received in recesses of planetary gear members having gear teeth at their outer peripheries. The planetary gear members are in drive engagement with an outer annular gear member and are driven by an inner gear member connected to a drive. In this planetary gear type mechanism the planetary gear members perform orbital movements while they rotate about their axes. The magnitude of the orbital and rotational speeds of the planetary gear members is directly related to the speed of the drive for the inner gear member and to the rolling geometry of the gear mechanism, i.e. to the ratios of the numbers of teeth of the inner and outer gear members and the planetary gear members.

For example increasing the speed of the inner gear member results in an increase of the rotational speeds of the planetary gear members. This is accompanied by an increase of the orbital speeds of the planetary gear members. As a result thereof the difference between the speeds of the working disk and the planetary gear members will change. If for machining reasons a predetermined speed difference is to be maintained, it is necessary to recalculate and reset the speed of the working disk. The speed of the inner gear member in itself is of no relevance. An important factor for the machining characteristics is the frequency of the workpieces moving back and forth between an inner position adjacent the inner gear member and an outer position adjacent the outer gear member. If such frequency is to be prefixed it is necessary to calculate and preset the required speed of the work-piece drive by means of the rolling geometry of the gear mechanism. This will result in the above mentioned undesired changes of the difference between the speeds of the working disk and the planetary gear members. In other words a change of the drive speed possibly will result in a substantial and not predictable change of the difference between the speeds of the work-pieces and abrasion surfaces, which change might be of substantial impact. This is so because the difference between the speeds of the work-pieces and working disks on the one hand and the rotational speeds of the planetary gear members or workpieces on the other hand is of decisive importance for the abrasion quality and the abrasion efficiency as well as for the geometry of the working disk.

For presetting the desired parameters it is only possible to adjust the speeds of the working disks and of the drive of the inner gear member and possibly the outer gear member for a given rolling geometry of the gear mechanism. In the prior art when a predetermined batch of work-pieces is to be machined the operator generally relies on empirical value; it would be necessary for him to perform sophisticated calculations to obtain optimum values of the abrasion efficiency and the abrasion quality when for example the speed of the inner gear member is changed. However, this is generally not done. Rather the operator will select a certain speed which he hopes to provide optimum results.

It is an object of the present invention to provide an apparatus for controlling operation of a lapping, honing or polishing machine which allows to optimize abrasion efficiency, quality and productivity in response to work-piece characteristics, tooling. etc.

In the prior art machines the speed of the working disk and the speed of the inner gear members are preselected as desired values. In contrast thereto the present invention provides a computer connected to a control stage of the control apparatus so as to calculate the desired values of said speeds from predetermined desired values of the rotational speed of the planetary gear member and the difference between the working disk speed and the planetary gear member orbital speed by means of certain formulas. It goes without saying that velocity values could be used instead of speed values. When the outer gear member is stationary the rotational speed of the planetary gear member may be calculated by the following formula:

$$n_L = K_L \cdot n_M$$

wherein $n_M$ represents the speed of the inner gear member and $K_L$ is a constant indicative of the rolling geometry of the gear mechanism, i.e. the ratio of the numbers of teeth of the planetary gear member and the inner and outer gear members. To obtain optimum results it is desirable to preselect the rotational speed $n_L$ of the planetary gear member in response to the work-piece material, its quality, the forces by which the working disk is urged against the work-pieces, the abrasive means, etc. Accordingly, if the rotational speed of the planetary gear member is preselected, the computer calculates the desired drive speed of the inner gear member in response thereto. The difference between the orbital speed of the planetary gear member and the speed of the working disk is also of material importance for abrasion efficiency and quality. If this speed difference is also preselected, the necessary speed of the work disk may be calculated by the following formula:

$$n_\Delta = n \pm K_{UL} \cdot n_M$$

wherein n represents the working disk speed, $n_M$, as defined above, represents the drive speed of the inner gear member, and $K_{UL}$ represents the ratio of teeth numbers necessary for obtaining the orbital speed. Also here it is possible to preselect a velocity instead of a speed.

In the apparatus of the present invention it is only the desired rotational speed of the planetary gear member and the difference between the speeds of the work-piece and the working disk which are preselected as desired values. When anyone of these parameters is changed, the other parameters will be automatically recalculated and reset in accordance with the above formulas.

If the machine also includes a drive for the outer gear member, the above mathematical relationships remain substantially the same. It is only necessary to add or subtract, depending on the direction of rotation, the speed of the outer gear member to the speed of the work-piece drive. The speed $n_A$ of the outer gear member is given by the following formulas:

$$n_M = n'_M \pm n_A$$

and $$n_A = -K_{UL} \cdot n'_M$$

wherein $n_M$ represents the combined speed and $n'_M$ represents the speed of the inner gear member.

The apparatus of the present invention allows a closed loop control by providing that speed or velocity sensors are associated with said drives, said sensors providing output signals representing actual speed values transmitted to the computer and compared in the computer with the desired values of the control signals.

Driving the outer gear member allows to select its speed so that the orbital speed of the planetary gear member will e.g. zero. This is the case if the speed $n_A$ of the outer gear member is of the same magnitude but of the opposite polarity as the orbital speed $n_{UL}$. In this case the difference between the speeds of the working disk and the planetary gear member is determined only by the speed of the working disk, and the planetary gear members rotate about a predetermined axis. Furthermore the apparatus of the present invention allows to make the orbital speed of the planetary gear member automatically to become zero in a predetermined position so that the planetary gear member is stopped at a predetermined position. Furthermore it is possible to prevent the planetary gear member in such defined position from rotating by stopping the drive of the inner and outer gear members in a predetermined circumferential position in order for example to remove a work-piece. The above mentioned speed sensors enable not only to measure speeds but also angles so that the circumferential positions of the inner and outer gear members ma be precisely determined.

Furthermore the invention allows to drive the working disk, the work-piece drive and the outer gear member at the same speed and direction of rotation so that the rotation of the planetary gear member will become zero in order to move the planetary gear member to a predetermined position.

Presetting the desired values according to the present invention does not automatically indicate to an operator whether the speeds of the working disk and/or the inner gear member drive exceed predetermined values. Accordingly a preferred embodiment of the present invention includes alarm means for generating an alarm signal when the speeds of the working disk and/or the inner gear member exceed predetermined values. The alarm signal for example may be used to limit the speeds.

For improving abrasion quality and efficiency and uniformity of wear of the work disks it may be adventageous to reverse the direction of rotation in a manner known per se. Accordingly in a further embodiment of the present invention the computer causes a reversal of the direction of movement of the drives of the inner gear member and/or the working disk when the abrasion and/or the number of rotations will attain predetermined values.

The invention will be explained in more detail with reference to the accompanying drawings.

Figure 1:
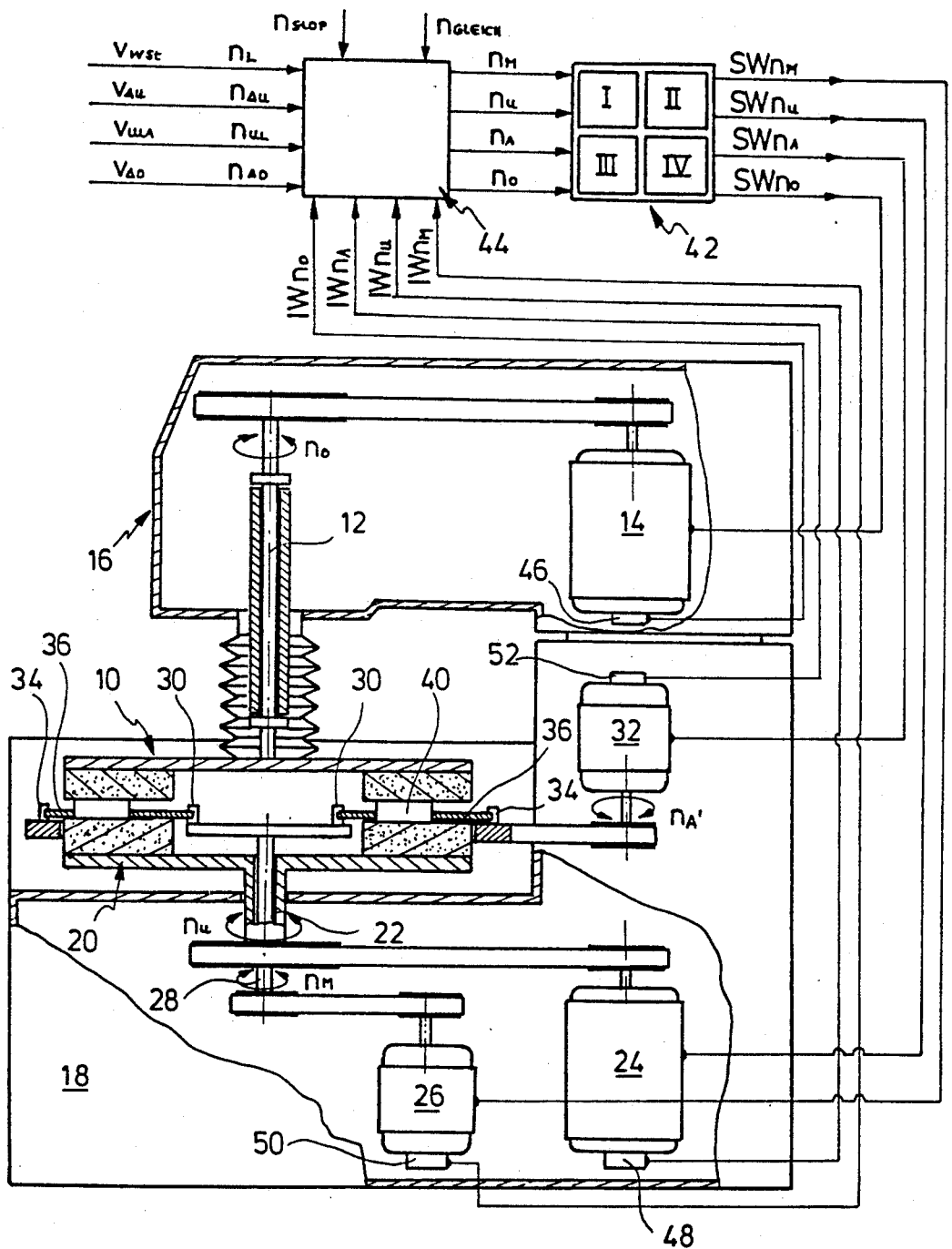
FIG. 1 shows in a schematic manner a double-disk lapping machine including an apparatus of the present invention.
Figure 2:
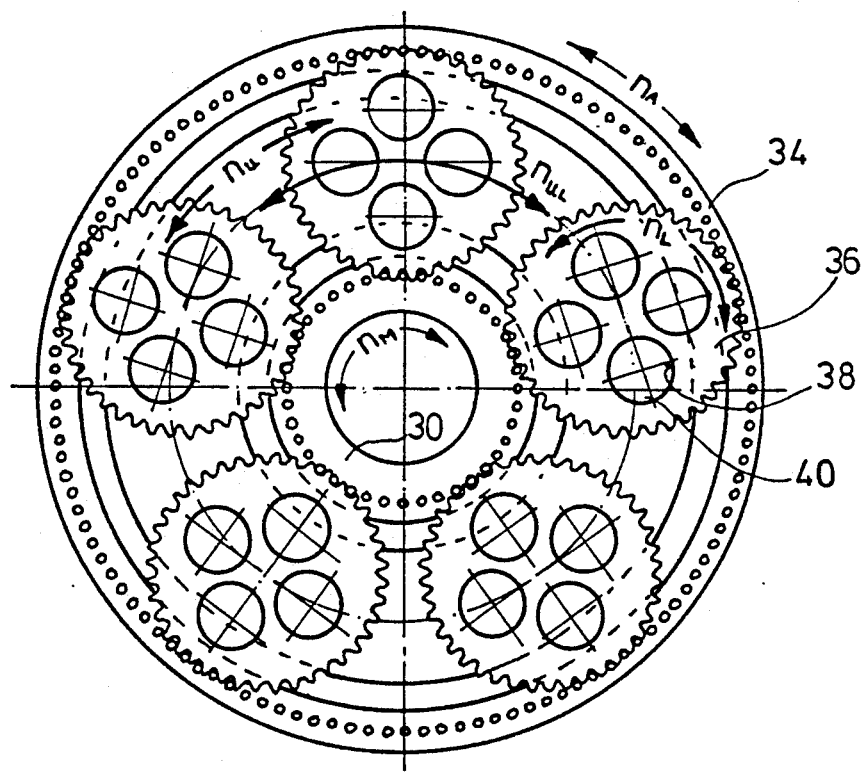
FIG. 2 shows an elevation of a planetary gear member assembly above the lower working disk of the lapping machine in FIG. 1.

The double-disk lapping machine shown in FIG. 1 includes an upper working disk 10 which is driven by a drive 14 via a shaft 12. The said members are arranged in an upper pivotal section 16 of the lapping machine which is supported upon a lower machine section 18. The lower machine section 18 supports a lower working disk 20 which is driven by a drive motor 24 via a shaft 22. A drive motor 26 drives an inner annular gear member 30 via a shaft 28, and a drive motor 32 drives an outer annular gear member 34 via a drive connection. As shown in FIG. 2 between the inner and outer gear members 30, 34 there are provided five planetary gear members 36 provided with teeth at their outer peripheries and having diameters such that they roll along the inner and outer gear members when at least one of said gear members is driven. The assembly is similar to that of a planetary gear assembly, with the planetary gear members 36 corresponding to the planetary gears of a planetary gear assembly. Each planetary gear member 36 comprises a disk having four recesses 38 for receiving work-pieces 40.

When the inner gear member 30 rotates at a speed $n_M$, the planetary gear members 36 orbit at a speed $n_{UL}$ and rotate about their axes at a rotational speed $n_L$. The magnitudes of the rotational speed $n_L$ and the orbital speed $n_{UL}$ depend, (additional to the drive speed $n_M$) on the so-called rolling geometry of the gear mechanism, i.e. the ratios of the numbers of teeth of the inner and outer gear members 30, 34 and the teeth at the peripheries of the planetary gear members 36. If also the outer gear member 34 is driven at a speed $n_A$, this will influence the orbital speed $n_{UL}$ and the rotational speed $n_L$. This will be explained in more detail below.

The desired values of the speeds of drives 14, 24, 26, 32 are generated in a control stage 42 comprising four substages I, II, III and IV for the desired value $SW_{AM}$ of the speed of the inner gear member 30, the desired value $SWn_U$ of the speed of lower working disk 20, the desired value $SWn_A$ of the speed of outer gear member 34 and the desired value $SWn_O$ of the speed of upper working disk 10, respectively. To this end control stage 42 receives preselected speed values $n_M$, $n_U$, $n_A$ and $n_O$ from a computer 44. Computer 44 includes four control inputs for the rotational speed $n_L$ of planetary gears 36, differential speed $n_{\Delta U}$, i.e. the difference between the speed of lower working disk 20 and orbital speed $n_{UL}$ of planetary gears, the orbital speed $n_{UL}$ of planetary gears 36 and differential speed $n_{\Delta O}$, i.e. the difference between the speed of upper working disk 10 and orbital speed $n_{UL}$ of planetary gears 36, respectively. In other words for controlling drives 14, 24, 36 and 32 it is not their speeds which are preselected, but rather the above mentioned differential speed, the orbital speed and, respectively, the rotational speed of the planetary gear members which are preselected. Instead of preselecting the speeds as shown in FIG. 1 it would just as well be possible to preselect the corresponding velocities, i.e. $V_{WST}$, $V_{\Delta U}$, $V_{ULA}$, $V_{\Delta O}$ because speed and velocity are related to each other in a fixed ratio K.

From the above preselected values computer 44 calculates the corresponding desired values of the drive speeds in accordance with the following formulas:

$$n_L = K_L \cdot n_M$$

$$n_{\Delta ou} = n_{ou} \pm K_{UL} \cdot n_M$$

wherein $K_L$ and $K_{UL}$ represent the ratios of the teeth numbers to obtain $n_L$ and $n_{UL}$, respectively. The lower formula will have to be applied both for the upper and lower working disks 10 and 20.

If for example the rotational speed of planetary gear members 36 is preselected due to requirements of the machine supplier e.g. depending on the type of workpieces and/or abrasive means, a certain speed of drive 26 for inner gear member 30 will follow. Furthermore for achieving optimum abrasion efficiency and quality the difference between the speed of the upper or lower working disk and the orbital speed of the planetary gear member will be preselected. From the above mentioned first formula and preselection of the rotational speed of the planetary gear member the speed $n_M$ of drive 26 will foolow, and from the lower formula speeds $n_u$ and $n_O$ of the lower and upper working disks 20 and 10 will follow. If any of the preselected values is changed, this will automatically result in a change of the other parameters without requiring any manual or other adjustments.

If the velocities instead of the rotational and orbital speeds are preselected, the following formulas will apply:

$$V_L = K1 \cdot (K_L \cdot n_M)$$

$$V_{\Delta ou} = K1 \, (n_{ou} \pm K_{UL} \cdot n_M)$$

wherein $V_L$ represents the rotational velocity of planetary gear members 36 and $V_\Delta$ represents the difference between the velocities of planetary gear members 36 and upper or lower working disk 20 or 10 at a predetermined radius.

If also outer gear member 34 is driven by drive 32, the mathematical relationships will remain substantially the same. It will be only necessary to add or subtract, depending on the direction of rotation, speed $n_A$ of outer gear member 34 to or from speed $n_M$ of inner gear member 34:

$$n_M = n'_M \pm n_A$$

wherein $n'_M$ represents the speed of inner gear member 30 and $n_M$ the combined speed of inner and outer gear members.

When outer gear member 34 is driven, its speed may be chosen so that the orbital speed $n_{UL}$ of planetary gear members 36 will be zero. This will be the case if speed $n_A$ of outer gear member 34 is of the same magnitude and of the opposite polarity as orbital speed $n_{UL}$:

$$n_A = K_{UL} \cdot n'_M.$$

To obtain this specific condition a control input $n_{Gleich}$ of computer 44 may be used. Other modes of operation are possible, for example a mode of operation where planetary gear members 36 orbit at zero rotational speed. In this case inner and outer gear members 30, 34 and preferrably the working disk rotate at the same speed. Finally in both modes of operation planetary gear members 36 may be stopped in predetermined positions. To this end position and speed sensors 46, 48, 50 and 52 are associated to drives 14, 24, 26 and 32 for sensing the actual speeds to be transmitted to inputs $IWn_U$, $IWn_A$, $IWn_M$ and $IWn_O$ of computer 44. The speed signals could be replaced by angle signals so that computer 44 would be able to determine the actual angular positions of inner and outer gear members 30, 34 at any time in order to stop planetary gear members 36 in predetermined positions in respect of gear members 30, 34 and in respect of their own orbital positions, for example to enable removal or reloading of workpieces 44 by automatic work-piece removal and loading means. Furthermore speed sensing allows a precise closed loop control of drives 14, 24, 26 and 32 in a manner known per se.

What is claimed is:

1. An apparatus for controlling operation of a lapping, honing or polishing machine comprising at least one working disk having an abrasive means for honing, lapping, or polishing the surface of a work-piece and adapted to be driven by a variable working disk drive, at least one planetary gear member for carrying said work-piece and having teeth at its outer periphery, and inner and outer gear members in driving engagement with said planetary gear member, at least said inner gear member being driven by a variable inner gear member drive, said apparatus including a control stage for providing a control signal to said working disk drive and said inner gear member drive for controlling desired drive speeds, the improvement of which includes a computer (44) connected to said control stage (42) for generating input signals for said control stage (42), which computer is arranged to calculate the speed of said inner gear member drive (26) and the speed of said working disk drive (24; 14) by the following formulas:

$$n_L = K_L \cdot n_M$$

$$n_\Delta = n \pm K_{UL} \cdot n_M,$$

wherein $K_L$ and $K_{UL}$ are constants of the rolling geometry of said gear members and $n_M$ representing the speed of said inner gear member, $n_M$, representing the drive speed of the inner gear member, n representing the speed of said working disk and $n_L$ representing the rotational speed of the planetary gear member and $n_\Delta$ representing the difference between the speed n of the working disk and the orbital speed of the planetary gear member (36) are preselected desired values.

2. The apparatus of claim 1, wherein instead of the speed values the corresponding analogous velocity values are preselected or used.

3. The apparatus of claim 1 including a drive (32) for said outer gear member (34), wherein the computer (44) is arranged to calculate the speed ($n'_M$) of the inner gear member (30) and the speed ($n_A$) of the outer gear member (34) by the following formulas:

$$n_M = n'_M \pm n_A$$

$$n_A = -K_{UL} \cdot n'_M.$$

4. The apparatus of claim 3, wherein the speeds ($n_A$), ($n_M$) of the outer and inner gear members are of the same magnitude, however of the opposite polarity.

5. The apparatus of claim 3, wherein the speeds ($n_A$, $n_M$) of the outer and inner gear members are of the same magnitude and the same polarity.

6. The apparatus of claim 5, wherein the speed of the working disk (n) is identical to the speed ($n_A$, $n_M$) of the inner and outer gear members.

7. The apparatus of claim 1, wherein speed sensors (46, 48, 50, 52) are associated with said drives (14, 24, 26, 32), said sensors providing output signals representing actual speed values transmitted to the computer (44) and compared in the computer with the desired values of the control signals.

8. The apparatus of claim 7, wherein the sensed speeds ($n_M$, n, $n_A$) or the corresponding velocities are visualized by digital display means.

9. The apparatus of claim 1 including a second working disk driven by a second working disk drive.

10. The apparatus of claim 3, wherein the computer (44) includes a separate control input adapted to specify the desired value of the speed or peripheral velocity of the outer gear member (34) to enable adjustment of the orbital speed ($n_{UL}$) of the planetary gear member (36).

11. The apparatus of claim 1 including means for measuring wear of said working disk (40) and/or means for counting the number of planetary gear orbits, the computer (44) initiating a speed reversal of said inner gear member drive (26) and said working disk drive when wear and/or the number of planetary gear member orbits have attained predetermined values.

12. The apparatus of claim 11 including alarm means for generating an alarm signal when the speeds ($n_U$, $n_O$) of the working disk (20, 10) and/or the inner gear member (30) exceed predetermined values.

* * * * *